United States Patent
Ploss et al.

(10) Patent No.: US 10,775,222 B2
(45) Date of Patent: Sep. 15, 2020

(54) MEASUREMENT DEVICE AND METHOD FOR DETERMINING A FLUID FLOW IN A MEASUREMENT TUBE

(71) Applicant: DIEHL METERING GMBH, Ansbach (DE)

(72) Inventors: Peter Ploss, Bayreuth (DE); Michael Mayle, Ansbach (DE)

(73) Assignee: Diehl Metering GmbH, Ansbach (DE)

( * ) Notice: Subject to any disclaimer, the term of this patent is extended or adjusted under 35 U.S.C. 154(b) by 154 days.

(21) Appl. No.: 16/026,120

(22) Filed: Jul. 3, 2018

(65) Prior Publication Data
US 2019/0025112 A1  Jan. 24, 2019

(30) Foreign Application Priority Data

Jul. 20, 2017 (DE) .................. 10 2017 006 909

(51) Int. Cl.
| | |
|---|---|
| *G01F 1/66* | (2006.01) |
| *G01F 23/296* | (2006.01) |
| *G01N 29/032* | (2006.01) |
| *G01N 29/028* | (2006.01) |
| *G01N 29/22* | (2006.01) |

(52) U.S. Cl.
CPC .......... *G01F 23/2968* (2013.01); *G01F 1/662* (2013.01); *G01F 1/667* (2013.01); *G01N 29/028* (2013.01); *G01N 29/032* (2013.01); *G01N 29/222* (2013.01)

(58) Field of Classification Search
None
See application file for complete search history.

(56) References Cited

U.S. PATENT DOCUMENTS

| | | | |
|---|---|---|---|
| 4,425,804 A * | 1/1984 | Mount | ...................... G01F 1/66 600/538 |
| 5,131,278 A * | 7/1992 | Baumoel | ................. G01F 1/662 73/861.18 |

(Continued)

FOREIGN PATENT DOCUMENTS

| | | |
|---|---|---|
| EP | 1173733 B1 | 5/2011 |
| JP | 2001304929 A | 10/2001 |

(Continued)

*Primary Examiner* — Harshad R Patel
(74) *Attorney, Agent, or Firm* — Laurence A. Greenberg; Werner H. Stemer; Ralph E. Locher

(57) ABSTRACT

A measurement module determines a fluid quantity which relates to a property of a fluid located in or flowing through a measurement tube. The measurement module contains a base body, a control device and first and second oscillation transducers fastened at a distance from one another on the base body. The first and/or the second oscillation transducer is controlled by the control device to excite an oscillation of a side wall of the measurement tube when a contact face of the measurement module is coupled to the side wall of the measurement tube directly or via a coupling layer. The oscillation of the side wall excites compression oscillations of the fluid, which are conducted through the fluid to the respective other oscillation transducer and recorded the control device to determine a measurement quantity. The fluid quantity can be determined by the control device in dependence on the measurement quantity.

15 Claims, 3 Drawing Sheets

(56) References Cited

U.S. PATENT DOCUMENTS

| | | | | |
|---|---|---|---|---|
| 5,327,894 | A * | 7/1994 | Thomas | G01S 7/52071 348/163 |
| 5,375,600 | A * | 12/1994 | Melton, Jr. | A61B 8/06 600/455 |
| 5,463,905 | A * | 11/1995 | Baird | G01F 1/663 73/861.23 |
| 5,522,393 | A * | 6/1996 | Phillips | A61B 8/06 600/455 |
| 5,540,230 | A * | 7/1996 | Vilkomerson | B06B 1/0662 600/454 |
| 5,637,800 | A * | 6/1997 | Finsterwald | B06B 1/0622 73/642 |
| 6,336,370 | B1 * | 1/2002 | van der Pol | G01F 1/8463 73/861.357 |
| 6,418,796 | B1 * | 7/2002 | Baumoel | G01F 1/662 73/861.27 |
| 6,748,811 | B1 * | 6/2004 | Iwanaga | G01F 1/662 73/861.18 |
| 2004/0050176 | A1 * | 3/2004 | Ohnishi | G01F 1/8427 73/861.18 |
| 2009/0025487 | A1 | 1/2009 | Gysling et al. | |
| 2010/0095782 | A1 * | 4/2010 | Ferencz | G01F 1/667 73/861.28 |
| 2011/0132102 | A1 * | 6/2011 | Ueberschlag | G01F 1/662 73/861.27 |
| 2012/0006127 | A1 * | 1/2012 | Nielsen | G01F 1/662 73/861.27 |
| 2012/0272750 | A1 * | 11/2012 | Fujii | G01F 1/662 73/861.28 |
| 2014/0086017 | A1 * | 3/2014 | Nakano | G01F 1/662 367/180 |
| 2014/0165740 | A1 * | 6/2014 | Speidel | B06B 1/0685 73/861.28 |
| 2015/0143919 | A1 * | 5/2015 | Nakano | G01F 1/66 73/861.28 |
| 2015/0160053 | A1 * | 6/2015 | Baumoel | G01F 1/667 73/861.28 |
| 2016/0109272 | A1 * | 4/2016 | Teufel | G01F 1/668 73/861.28 |
| 2016/0195418 | A1 * | 7/2016 | Drachnnann | G01F 1/667 73/861.28 |
| 2016/0334252 | A1 * | 11/2016 | Kashima | G01F 1/662 |
| 2017/0122916 | A1 | 5/2017 | Leaders et al. | |
| 2017/0336231 | A1 * | 11/2017 | Herrmann | G01F 1/667 |
| 2018/0156651 | A1 * | 6/2018 | Schulz | B23B 35/00 |
| 2019/0257679 | A1 * | 8/2019 | Wiest | G01F 1/002 |

FOREIGN PATENT DOCUMENTS

| | | |
|---|---|---|
| JP | 2003262545 A | 9/2003 |
| WO | 2015134715 A2 | 9/2015 |

* cited by examiner

MEASUREMENT DEVICE AND METHOD FOR DETERMINING A FLUID FLOW IN A MEASUREMENT TUBE

CROSS-REFERENCE TO RELATED APPLICATION

This application claims the priority, under 35 U.S.C. § 119, of German application DE 10 2017 006 909.3, filed Jul. 20, 2017; the prior application is herewith incorporated by reference in its entirety.

BACKGROUND OF THE INVENTION

Field of the Invention

The invention relates to a measurement module for determining a fluid quantity. The invention furthermore relates to a measurement device and to a method for determining a fluid quantity.

Recording of fluid quantities is relevant particularly in the field of water and heat meters. It is in this case known that in many applications, it is regularly necessary to replace or service corresponding meters. To this end, it is usually necessary to replace the entire meter. This is disadvantageous because, for this, the line on which the meter is arranged needs to be opened, so that on the one hand fluid can emerge into the surroundings, and on the other hand it is necessary to take care not to contaminate the line.

In order to facilitate replacement of meters, it is known to use so-called measurement capsule meters, in which only a measurement capsule is replaced. In this case, however, components of the measurement capsule are still in contact with the fluid to be measured during measurement operation, so that although the costs of meter replacement can be reduced by the use of measurement capsules, it is nevertheless necessary to open the fluid line.

SUMMARY OF THE INVENTION

The object of the invention is therefore to provide a measurement module which allows easier meter replacement in comparison with this.

The object is achieved according to the invention by a measurement module for determining a fluid quantity which relates to a property of a fluid located in or flowing through a measurement tube formed separately from the measurement module and/or the flow thereof. The measurement module contains a base body, a control device and a first and a second oscillation transducer fastened at a distance from one another on or in the base body. The first and/or the second oscillation transducer can be controlled by the control device in order to excite an oscillation of a side wall, or a respective side wall, of the measurement tube when a contact face, or a respective contact face, of the measurement module is coupled to the side wall, or the respective side wall, of the measurement tube directly or via a coupling layer. The oscillation of the side wall excites compression oscillations of the fluid, which can be conducted through the fluid to the respective other oscillation transducer and recorded there by the control device in order to determine a measurement quantity. The fluid quantity can be determined by the control device in dependence on the measurement quantity.

According to the invention, it is proposed to use the transport of compression oscillations through the fluid in order to determine properties of the fluid, these oscillations being recorded by a separate measurement module after being coupled into, or after transport through, the fluid. The essential advantage of the measurement module according to the invention over conventional ultrasonic meters is that the measurement module can be replaced without opening the measurement tube. In order to achieve this oscillations can be coupled by the measurement module into, or respectively out of, the side wall, or the respective side wall, of the measurement tube. The fluid is therefore not excited directly by the oscillation transducers, but instead the side wall, or the respective side wall, of the measurement tube is initially excited and in turn excites the fluid in compression oscillations, after which the compression oscillations of the fluid in turn excite a side wall of the measurement tube, after which this oscillation of the side wall can again be recorded by the measurement module. The measurement tube may be arranged on a side wall of the measurement tube, in order to couple oscillations into this side wall, or respectively couple them out of this side wall. It may, however, also contain a plurality of contact faces, which engage on a respective side wall in order to couple oscillations in and out there. In particular, a first contact face may engage on a first side wall and a second contact face may engage on a second side wall, in particular one lying opposite the first side wall.

The use of oscillation transport for recording fluid properties is in principle known in the prior art. For example, in ultrasonic meters, it is often the case that time-of-flight differences of a time of flight of an oscillation between a first and a second ultrasound transducer and vice versa are recorded and a flow rate can be determined therefrom. It is, however, also possible to evaluate other measurement quantities in order to determine fluid properties. For example, a signal amplitude at the receiving oscillation transducer may be evaluated in order to record an attenuation of the oscillation during transport through the fluid. Amplitudes may also be evaluated frequency-dependently, and absolute or relative amplitudes of particular spectral ranges may be evaluated in order to record a spectrally different attenuation behaviour in the fluid. Phase angles of different frequency bands may also be evaluated in order, for example, to obtain information about the dispersion relation in the fluid. As an alternative or in addition, changes in the spectral composition or the amplitude as a function of time, for example within a measurement pulse, may also be evaluated.

By evaluating these quantities, a flow rate and/or a flow volume and/or a density, temperature and/or viscosity of the fluid may for example be determined as fluid quantities. In addition or as an alternative, for example, a speed of sound in the fluid and/or a composition of the fluid, for example a mixing ratio of different components, may be determined. Various approaches for obtaining these fluid quantities from the measurement quantities explained above are known in the prior art, and will therefore not be presented in detail. For example, relationships between one or more measurement quantities and the fluid quantity may be determined empirically, and for example a look-up table or a corresponding formula may be used in order to determine the fluid quantity.

As an oscillation of the side wall, in particular a wave conducted through the side wall of the measurement tube, in particular a Lamb wave, may be excited. Excitation of Lamb waves takes place when the wall thickness is comparable to the wavelength of the transverse wave in the solid. Such conducted waves are combined compression and shear waves, and therefore also lead to a deflection of the inner face of the side wall in the direction of the fluid, or away from the fluid. By this deflection, compression waves are in turn initiated in the fluid. The entire region within which the conducted wave propagates on the side wall may therefore be used as an excitation surface for a compression oscillation of the fluid. Conversely, a compression oscillation of the fluid in a wall region of the side wall may excite corresponding Lamb waves, which are then conducted in the side wall to the other oscillation transducer.

The oscillation transducers may, in particular, be ultrasound transducers. These may, for example, be produced with the aid of at least one piezoelectric oscillation element and corresponding driving by the control device. Details of the structure of possible oscillation transducers, and in particular of the possibility of mode-selective excitations of conducted waves, will be explained in more detail below.

The contact face may lie directly on an outer side face of the side wall, or the outer side face and the contact face may both lie on the coupling layer. It is possible to press the measurement module onto the side wall, or the coupling layer, by a clamping device. It may, however, also be sufficient for the measurement module to lie on the side wall, or the coupling layer.

In order to allow operation, or reading, of the measurement module, the measurement module preferably contains a display, which may be usable to display measurement values and/or status information, and/or operating elements for operating and/or configuring the measurement module.

Since the measurement module according to the invention already has two oscillation transducers with a defined separation, and an associated control device, the advantage over the arrangement of single oscillation transducers on the measurement tube is achieved that the measurement parameters are already substantially established in the measurement module itself, so that despite simple installation a high measurement accuracy can be achieved. If, furthermore, a defined position of the measurement module relative to the measurement tube is predefined by the provision of corresponding retention devices, recesses or the like on the measurement tube, it is therefore also possible to calibrate the measurement module independently of the measurement tube specifically used. It is therefore not necessary to calibrate or validate the overall system actually used, consisting of a measurement module and measurement tube, but instead it is possible to calibrate or validate the individual components independently of one another, so that replacement of measurement modules can be readily possible even when, for example, it is necessary to comply with certain system-related or statutory specifications for measurement accuracy.

The base body may be or contain a, in particular planar, oscillation plate. A contact face being formed by a first side face of the oscillation plate, the first and second oscillation transducers being arranged on a second side face of the oscillation plate, lying opposite the first side face. The first and/or second oscillation transducer may lie directly on the oscillation plate, or be coupled thereto via a coupling element. The oscillation plate may, for example, be made of metal or plastic. For example, the oscillation plate may be formed from the same material as the measurement tube. The use of an oscillation plate makes it possible to conduct the induced oscillations in the oscillation plate, so that excitation of the side face can take place essentially in the entire propagation region of the wave guided in the oscillation plate.

The oscillation plate may have, arranged between the first and the second oscillation transducer, a reflection element and/or attenuation element by which a wave coupled into the oscillation plate by the first and/or second oscillation transducer can be reflected and/or scattered and/or attenuated. The reflection element may be formed in one piece with the oscillation plate or be fastened thereon. For example, the reflection element may be provided by the oscillation plate being thicker or thinner in the region of the reflection element than in the surrounding regions, the thickness preferably changing discontinuously. Discontinuous changes in the thickness of the oscillation plate can lead to sudden changes in the mode structure, and therefore to reflections of the wave incident on this boundary. By applying an attenuation element which is elastically deformable and has a high internal friction, the conducted wave can be deliberately attenuated. For example, a in particular flat attenuation element consisting of plastic, in particular of an elastomer, may be applied, for example adhesively bonded, onto the oscillation plate.

The reflection element preferably extends over the entire width of the oscillation plate, so that the first and second oscillation transducers can be decoupled from one another in relation to oscillation conduction through the oscillation plate. In the case of excitation by the first oscillation transducer, essentially only oscillations that have been conducted through the fluid are therefore received by the second oscillation transducer, since oscillations conducted through the oscillation plate, or through the side wall, are at least substantially reflected or scattered by the reflection element. In order to avoid formation of standing waves, it is advantageous for at least one side face, facing toward the respective oscillation transducer, of the reflection element to be at an angle to the connecting line between the oscillation transducers. For example, the reflection element may have a rhombus shape, the oscillation transducers respectively facing toward vertices of the rhombus.

The oscillation plate may be configured in such a way that a wave conducted through the oscillation plate, or together through the oscillation plate and the side wall, can be excited by driving of the first and/or second oscillation transducer by the control device. In this case, in particular, a Lamb wave may be excitable. The material and/or the thickness of the oscillation plate may be selected in such a way that, for at least one frequency used for operating the oscillation transducers, the wavelength of the resulting conducted wave in the oscillation plate and the side wall are the same.

The base body may delimit a closed internal volume, in which the first and the second oscillation transducers are arranged. The internal volume is, in particular, bounded on one side by the oscillation plate. Because of the arrangement in a closed internal volume, the oscillation transducers are protected from environmental influences. Furthermore, manipulation protection for the measurement module may be achieved in this way, so that for example manipulations of a calibration carried out once for determining the fluid quantity are not possible, or are possible only with great outlay.

Depending on properties of the measurement tube used, it may be advantageous, instead of an oscillation plate on which the oscillation transducers are arranged, to excite the side wall of the measurement tube directly or via the coupling layer. At least one respective section of the contact face, or the respective contact face, may therefore be formed by the first and/or the second oscillation transducer or a coupling element, which is coupled to the respective oscillation transducer and is formed separately from the base body. In particular, one section of the first contact face may be formed by the first oscillation transducer, and one section of the second contact face may be formed by the second oscillation transducer, or the two oscillation transducers may form separate sections of the same contact face. The oscillation transducers may, for example, be fastened on the base body laterally, or with a side face lying opposite the contact face. Preferably, the base body and the oscillation transducers together form a seamless contact face.

The first and/or the second oscillation transducer may be fastened on the base body by a respective decoupling element used for oscillation decoupling. This is particularly advantageous when direct excitation of the side wall of the measurement tube with the oscillation transducer, or by a coupling element coupled thereto, is intended to be carried out. The base body may therefore be substantially decoupled from the oscillation of the first and/or the second oscillation transducer, so that for example influencing of natural modes of these oscillation transducers by the base body is reduced or avoided.

The decoupling element may be configured in such a way that a transmission factor for the oscillations which are used for excitation of the side wall is less than 0.5, in particular less than 0.3 or 0.1. Low transmission factors may on the one hand be achieved by large changes in the acoustic impedance between the oscillation element and the decoupling element, or the decoupling element and the base body. On the other hand, a material with strong oscillation attenuation in the relevant oscillation range, for example a foam with closed pores, may be used as the material of the decoupling element.

The acoustic impedances of the oscillation transducer and of the decoupling element, or of the decoupling element and of the base body, may differ by a factor of at least 2 or 5 or 10. Since the reflection coefficient is calculated as the ratio between the difference and the sum of the impedances, a factor of 3 leads for example to a reflection coefficient of 0.5. The factor between the impedances may be at most 20, 30 or 50. Large differences in the acoustic impedance may, for example, be achieved between metal and plastic.

As already explained in the introduction, conducted waves are preferably intended to be excited in the oscillation plate, or in the side wall, by the first or second oscillation transducer, respectively. In this case, it is advantageous if substantially pure-mode excitation can be achieved. The dispersion relation of Lamb waves, for example, has branches, or modes, for which reason different wavelengths of the Lamb wave may result in the oscillation plate, or the side wall, with an excitation frequency predetermined in a fixed fashion. Yet since the angle at which the compression oscillations are emitted into the fluid depends on the phase velocity of the conducted wave, which is typically different for different excitation modes with the same frequency, different propagation paths for the compression oscillations in the fluid result for different modes. Although this may potentially be used to obtain additional information about the fluid, separation of the signals which result from different propagation paths is nevertheless often very elaborate. Furthermore, such separation is not reliably possible in all applications. It is therefore advantageous if, in the measurement module according to the invention, oscillation transducers are used which allow mode-selective excitation of conducted waves in the oscillation plate, or the side wall. Various approaches, which will be discussed below, may be envisioned for this.

The oscillation plate and/or the side wall and/or a contact element arranged between the contact face or the side wall and the respective oscillation transducer may respectively be excitable in a plurality of mutually separated excitation sections by the first and/or the second oscillation transducer. This ultimately leads to a spatially inhomogeneous excitation of the oscillation plate, or of the side wall. This may be deliberately used in order to excite particular oscillation modes of the side wall, or of the oscillation plate, in particular oscillation modes of conducted waves, for example Lamb waves, with high mode purity. This may be achieved by tuning the excitation pattern used to a wavelength of a conducted wave to be excited.

In order to achieve corresponding excitation, the first and/or the second oscillation transducer may comprise a respective oscillation element which contacts the oscillation plate, the side wall or the contact element in a plurality of mutually separated contact regions. As an alternative or in addition, the contact element may contact the side wall, or the oscillation plate, in mutually separated contact regions. As an alternative or in addition, a plurality of oscillation elements may be used, which are arranged at a distance from one another on the oscillation plate, the side wall or the contact element.

The centers of the excitation sections may lie at a distance from one another which corresponds to an integer multiple of the wavelength of the conducted wave to be excited.

Separated excitation regions may, for example, be produced by using a contact element which has a plurality of mutually separated ribs, which are preferably connected by at least one connecting section. A single oscillation element may extend over a plurality of these ribs, or separate oscillation elements may be provided for the individual ribs.

Mutually separated excitation sections may also be produced by the oscillation plate, or the side wall, having a contact structure which has a plurality of projections and/or at least one recess, the oscillation element or the oscillation elements lying exclusively on the projections, or outside the recesses.

The first and/or the second oscillation transducer may be planar, in particular piezoelectric, oscillation transducers, which are arranged parallel to the contact face. In order to achieve mode selectivity of the excitation in this case, as explained above excitation may be carried out in separated excitation sections. As an alternative, it is for example possible for the oscillation transducer to be an interdigital transducer, which has an electrode structure in which oppositely poled electrodes engaging in one another in the manner of fingers. By tuning the separations of the electrodes engaging in one another, the excitation of oscillations with particular wavelengths may be promoted or suppressed.

Mode-selective excitation may, however, also be possible in the case of simple electrodes, or drive structures. For example, the first and/or the second oscillation transducer may be a piezoelectric oscillation transducer which has precisely one electrode on the measurement tube side and precisely one electrode on the other side from the measurement tube, these being arranged on mutually opposite side faces of the respective oscillation transducer. As an alternative, the respective oscillation transducer may have a plurality of electrodes on the measurement tube side and at least one electrode on the other side from the measurement tube, or a plurality of electrodes on the other side from the measurement tube and at least one electrode on the measurement tube side, the control device being configured to define the voltage between the electrodes so that the sign of the voltage between a respective electrode on the measurement tube side and a respective electrode on the other side from the measurement tube is the same for all pairs of electrodes of the respective oscillation transducer which are on the measurement tube side and the other side from the measurement tube. In particular there may be essentially no voltage drop between the electrodes on the measurement tube side, and/or essentially no voltage drop between the electrodes on the other side from the measurement tube. Mode-selective excitation may, in particular, be achieved by using a piezoelectric oscillation transducer which is matched to the mode structure of the side wall, or of the oscillation plate. For example, the oscillation transducer may be configured in such a way that a natural oscillation of the oscillation transducer has the same frequency and the same wavelength as a conducted wave to be excited, which is conducted through the side wall and/or the oscillation plate. In this case, inhomogeneous excitation of the oscillation plate, or of the side wall, for essentially pure-mode excitation of oscillations may be achieved by using the natural oscillation of the oscillation transducer itself.

Another possibility for excitation of conducted waves in the oscillation plate, or the side wall, is for the first and/or the second oscillation transducer respectively to comprise an oscillation element which can be driven by the control device, or a plurality of these oscillation elements, and an oscillation body, a side face or side faces of the oscillation body, which face or faces carries or carry the oscillation element or the oscillation elements, being at an angle to the contact face. The oscillation element may be excitable in oscillations by the control devices. For example, the oscillation element may be piezoelectrically excitable. A wedge-shaped oscillation body or a rod-shaped oscillation body may be used. The oscillation element may be arranged on a side face, lying opposite the contact face, of the oscillation body. As an alternative, one or preferably a plurality of oscillation elements may be arranged on one or a plurality of side faces of the oscillation body, which have an edge in the region of the contact face, or of the oscillation plate. By such oscillation elements, for example, a rod-shaped oscillation body may be set in flexural oscillations, which may be used in order to couple surface waves into the oscillation plate and/or the side wall.

In one preferred embodiment, the oscillation body may be elongate, and in particular have a sheet-like flat shape, a first section of the oscillation body lying on the measurement tube or the oscillation plate. The oscillation body being curved at least in sections so that a second section of the oscillation body protrudes at an angle from the measurement tube, or the oscillation plate, the oscillation elements in the second section being arranged on the oscillation body.

Besides the measurement module according to the invention, the invention relates to a measurement device for determining a fluid quantity which relates to a property of a fluid located in or flowing through a measurement tube and/or the flow thereof. The measurement device contains a measurement module according to the invention, and the contact face, or the respective contact face, of the measurement module being coupled to a side wall, or a respective side wall, of the measurement tube of the measurement device directly or via a coupling layer.

The coupling layer may be formed by a further fluid arranged between the measurement module and the side wall, or by a film arranged between the measurement module and the side wall. As a further fluid, a fluid with a high viscosity, for example a paste, a gel or a lubricant may in particular be used. The viscosity of the further fluid may for example be adapted by adding particles, in particular metal particles. A film used as a coupling layer may, in particular, be elastically deformable.

As an alternative or in addition, it is possible for the measurement device to comprise a clamping means, by which the contact face is pressed onto the side wall. For example, a tension band may be fed around the measurement module and the measurement tube, this band pressing the measurement module onto the measurement tube, or the like.

The side wall of the measurement tube may have a recess, the bottom face of which is coupled to the contact face of the measurement module directly or via the coupling layer. The shape of the recess may be selected in such a way that the measurement module engages with a form fit into this recess, and is therefore held in a defined position. In this way, the relative position of the measurement module with respect to the measurement tube, and therefore also the relative position of the oscillation transducers with respect to the measurement tube, can be established, so that reproducible measurements can be achieved even after a module replacement or when using the measurement module on a different measurement tube.

The invention furthermore relates to a method for determining a fluid quantity which relates to a property of a fluid located in or flowing through a measurement tube formed separately from a measurement module and/or the flow thereof. The measurement module contains a base body and a first and a second oscillation transducer fastened at a distance from one another on or in the base body. A contact face, or a respective contact face, of the measurement module is coupled to a side wall, or a respective side wall, of the measurement tube directly or via a coupling layer, after which the first and/or the second oscillation transducer are driven in order to excite an oscillation of the side wall. Compression oscillations of the fluid are excited by the oscillation of the side wall, which are conducted through the fluid to the respective other oscillation transducer and recorded there by the control device in order to determine a measurement quantity. The fluid quantity is determined as a function of the measurement quantity. The method according to the invention may be refined with those features which have been explained in relation to the measurement module according to the invention, or the measurement device according to the invention, and vice versa.

Other features which are considered as characteristic for the invention are set forth in the appended claims.

Although the invention is illustrated and described herein as embodied in a measurement module for determining a fluid quantity, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
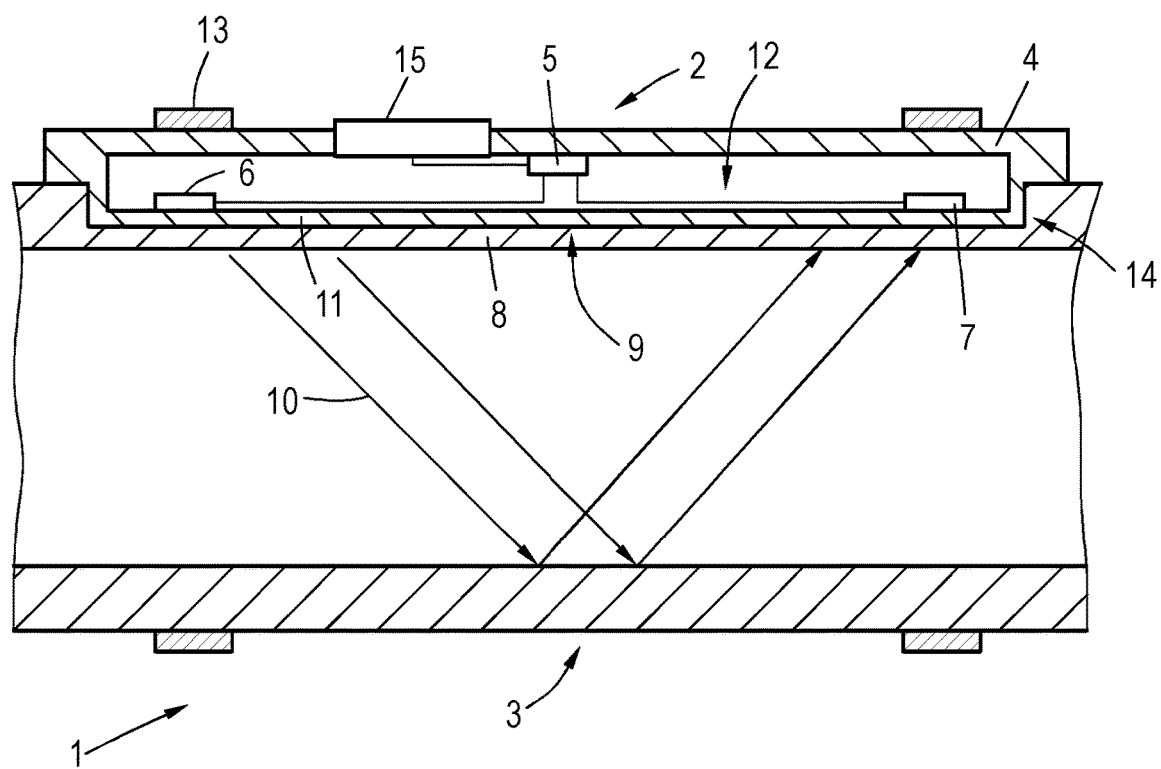
FIG. 1 is a diagrammatic, sectional view of one exemplary embodiment of a measurement device according to the invention, which comprises one exemplary embodiment of a measurement module according to the invention.

Referring now to the figures of the drawings in detail and first, particularly to FIG. 1 thereof, there is shown a measurement device 1 for determining a fluid quantity which relates to a property of a fluid located in or flowing through a measurement tube 3 and/or the flow thereof. This will be described below with reference to the example of the measurement of a flow rate by time-of-flight measurements of ultrasound waves transmitted through the fluid. In the prior art, however, approaches are also known for determining for example the density, the temperature, the viscosity, the speed of sound or the composition of a fluid by transmitting ultrasound waves through the fluid. Yet since the focus here is on the mechanical structure of the measurement device, these methods, which primarily relate to the evaluation of the measurement data, will not be explained in detail.

Besides the measurement tube 3, the measurement device contains a measurement module 2, which is formed separately from the measurement tube 3. This, for example, makes it possible to replace the measurement module 2 when required, without opening the measurement tube 3, so that for example it is possible to avoid fluid emerging or possible contamination of the interior of the tube. The measurement module 2 contains a base body 4, a control device 5, and a first and second oscillation transducer 6, 7, which are fastened at a distance from one another on the base body 4. The first and second oscillation transducers 6, 7 can be driven by the control device 5 in order to excite an oscillation of a side wall 8 of the measurement tube, when a contact face 9 of the measurement module 2 is coupled to the side wall 8 of the measurement tube 3.

In the exemplary embodiment shown, the excitation of the side wall is carried out indirectly. The oscillation transducers 6, 7 are arranged on an oscillation plate 11, which forms a part of the base body 4. The contact face 9 is formed by a first side face of the oscillation plate 11, and the two oscillation transducers 6, 7 are arranged on the side faces lying opposite the latter. The oscillation transducers 6, 7 may, with corresponding driving by the control device 5, excite conducted waves, in particular Lamb waves, in the oscillation plate 11. Since Lamb waves are combined compression and shear waves, this oscillation is also transmitted onto the side wall 8 and, with corresponding matching of the components to one another, a Lamb wave is also excited in the side wall 8.

By this oscillation of the side wall, compression oscillations of the fluid are excited, as is represented by the arrows 10. Emission of these compression oscillations takes place essentially in the entire region inside which the conducted wave propagates in the side wall 8. This is represented by the lateral offset of the arrows 10.

The compression wave is conducted through the fluid to the respective other oscillation transducer 6, 7, in the scope of which it may be reflected at the side walls of the measurement tube, under certain circumstances even several times. The incident wave packet is recorded by the control device 5 by the oscillation transducer 6, 7 respectively not used for the emission, in order to determine a measurement quantity. In the example shown, a flow rate is intended to be measured. To this end, a time-of-flight difference of the oscillation from the oscillation transducer 6 to the oscillation transducer 7 and vice versa can be determined, and the flow rate can be determined therefrom, as is widely known from the field of ultrasonic meters. In principle, however, other quantities could also be evaluated, for example the amplitude of the received signal, its spectral composition, for example absolute or relative amplitudes of different spectral bands, and time variations of the signal, for example of a phase of the received oscillation, of the spectral composition or of the amplitude.

The base body 4 forms a closed internal volume 12 of the measurement module 2, in which the oscillation transducers 6, 7 are arranged. On the one hand, this is used to protect the oscillation transducers 6, 7 against contamination, or damage, and on the other hand by encapsulation of the oscillation transducers 6, 7 and the control device 5, a manipulation of the measurement module or of the measurement device may potentially be prevented or made difficult, for example when the measurement device is used for billing purposes.

In order to improve the oscillation coupling between the oscillation plate 11 and the side wall 8, the measurement module 2 is pressed onto the side wall 8 by a clamping device 13, for example a clamping band.

In order to ensure reproducible measurements even in the event of a module replacement, it is advantageous to establish the position of the measurement module 2 relative to the measurement tube 3 uniquely. For this reason, the measurement tube 3 has a recess 14, into which a section of the measurement module 2 engages with a form fit.

For servicing and reading purposes, the measurement module 2 has a control panel 15, which may for example comprise a display device and a plurality of control elements.

Figure 2:
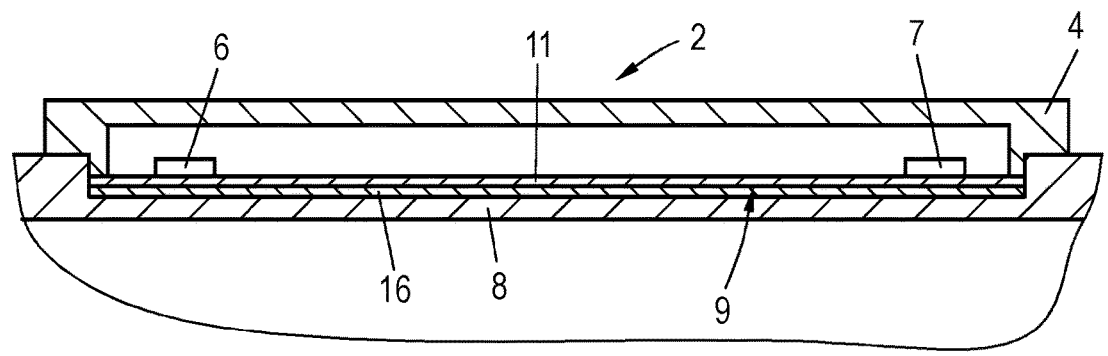
FIGS. 2-8 are detailed, sectional views of further exemplary embodiments of measurement devices according to the invention.

In some cases, it may be desirable to improve the coupling between the measurement module 2 and the side wall 8. For this reason, as is represented in FIG. 2, a coupling layer 16 may be provided between the measurement module 2 and the side wall 8. The coupling layer 16 may be formed by a fluid, in particular a fluid with a high viscosity, for example a paste, a gel or a lubricant, or an in particular elastically deformable film. Such a coupling layer may compensate for irregularities of the side wall 8, or of the contact face 9, and therefore improve the oscillation coupling.

Figure 3:
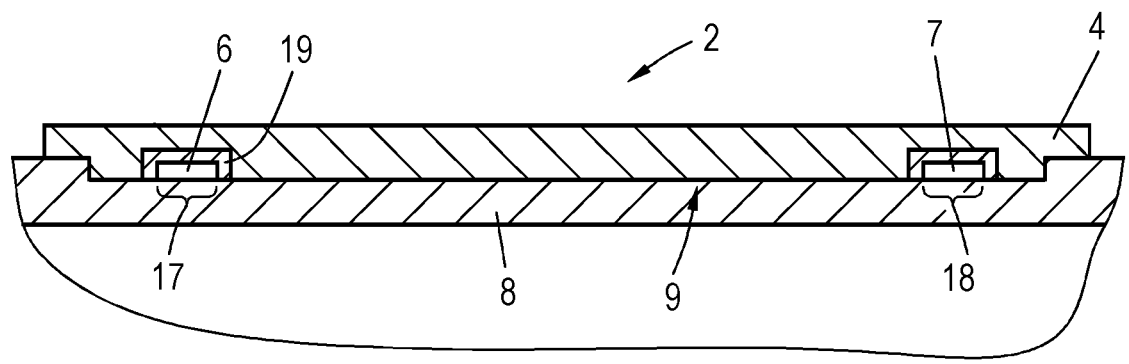

Depending on the material and thickness of the side wall 8, under certain circumstances it may be advantageous to couple oscillations directly from the oscillation transducer 6, 7 into the side wall 8, as is represented by way of example in FIG. 3. In this case, a respective section 17, 18 of the contact face 9 is formed by the first or second oscillation transducer 6, 7, respectively. As an alternative, it would additionally be possible to provide a coupling element, formed separately from the base body 4, between the respective oscillation transducer 6, 7 and the side wall, as will be further explained below with reference to FIG. 4.

In the case of direct coupling of the oscillation transducer 6, 7 to the side wall 8, it is often advantageous to decouple the oscillation transducers 6, 7 from the base body 4. The oscillation transducers 6, 7 are therefore coupled to the base body 4 by a respective decoupling element 19, the transmission factor of the oscillations which are used for excitation of the side wall 8 being, for example, less than 0.3 or 0.1.

In order to achieve this, two approaches are used. On the one hand, a material whose acoustic impedance differs significantly from the acoustic impedance of the oscillation transducer 6 and of the base body 4 is used as the material of the decoupling element 19. For example, a metal may be used as the base body 4, the oscillation transducer 6 may be substantially formed from a ceramic, and the decoupling element may be a plastic with, for example, a low acoustic impedance. On the other hand, a material with strong acoustic attenuation in the relevant frequency range is used. For example, a foamed plastic with closed pores may be used.

FIGS. 1-3 show the oscillation transducers 6, 7, in each case schematically as a block which lies flat on the oscillation plate 11, or on the side wall 8. This is, for example, applicable when an interdigital transducer is used as the oscillation transducer 6, 7, or when for example a block of piezoceramic or another piezoelectric material is used, the natural oscillation modes of which are tuned to the natural oscillation modes of the oscillation plate 11, or of the side wall 8, in such a way that, for at least one frequency, a natural oscillation of the oscillation transducer 6, 7 has the same wavelength as an induced conducted wave. In principle, however, it is also possible to use other structures of the oscillation transducers 6, 7, with which under certain circumstances better mode selectivity can be achieved. Examples of this are shown in FIGS. 4-8. In the examples shown, the oscillation transducers are placed on an oscillation plate 11. However, corresponding oscillation transducers may of course also be arranged as shown in FIG. 3, that is to say with arrangement of the measurement module 2 on the measurement tube 3 directly on the side wall 8 of the measurement tube instead of on the oscillation plate 1.

Figure 4:
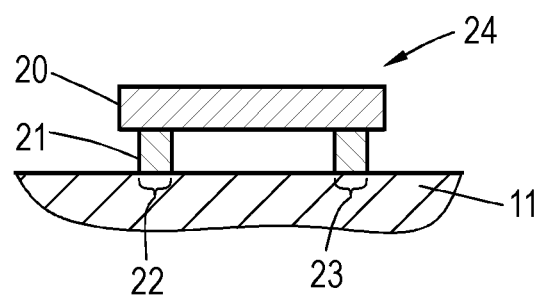

The oscillation transducer 24 shown in FIG. 4 contains an oscillation element 20, for example a block of piezoceramic or another piezoelectric material, which is coupled to the oscillation plate 11 by a contact element 21. The contact element has a comb-like structure, so that excitation of the oscillation plate 11 takes place essentially only in the excitation regions 22, 23. By selection of a corresponding distance between the excitation regions 22, 23, a wavelength may be specified for the conducted wave to be excited, so that an improved mode selectivity can be achieved.

Instead of using a separate contact element, the comb-like structure shown in FIG. 4 may, for example, also be implemented by providing corresponding comb-like structures, on which the oscillation element 20 lies, on the side wall 8, or on the oscillation plate 11. Instead of a single oscillation element, a separate oscillation element could furthermore be used for each strut of the contact element 21, or for each projection.

Figure 5:
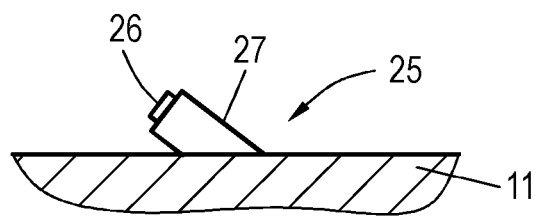

Mode selectivity may also be achieved by coupling oscillations at an angle into the oscillation plate 11, or into the side wall 8. One possibility of this is represented in FIG. 5. The oscillation transducer 25 in this case consists of an oscillation element 26, for example a piezoelectric oscillation element, and an oscillation body 27. The oscillation body has an elongated wedge shape, the oscillation element 26 being arranged on the side of the oscillation body 27 which lies opposite the oscillation plate 11, or the contact face 9. The excited mode in this case depends on the angle between the oscillation body 27 and the contact face 9, or the oscillation plate 11.

Figure 6:
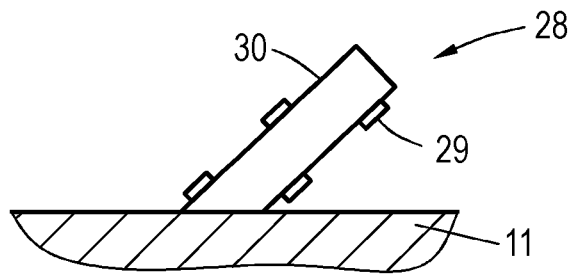

FIG. 6 shows a similar structure, the oscillation body 30 of the oscillation transducer 28 being longer and rod-shaped, i.e. in particular round. The oscillation elements 29 are arranged on that side face of the oscillation body which extends as far as the oscillation plate 11, or as far as the contact face 9. They are arranged opposite and offset relative to one another, in order to excite flexural oscillations of the oscillation body 30, which can be coupled as a conducted wave into the oscillation plate 11, or the side wall 8.

Figure 7:
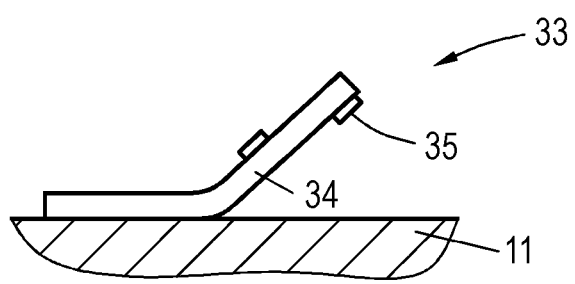

FIG. 7 also shows a similar structure, the oscillation body 34 of the oscillation transducer 33 having a sheet-like flat shape. A first section of the oscillation body 34 lies flat on the oscillation plate 11. By local curvature of the oscillation body 34, a further section of the oscillation body 34 protrudes at an angle from the oscillation plate 11, the oscillation elements 35 being arranged on this section.

Figure 8:
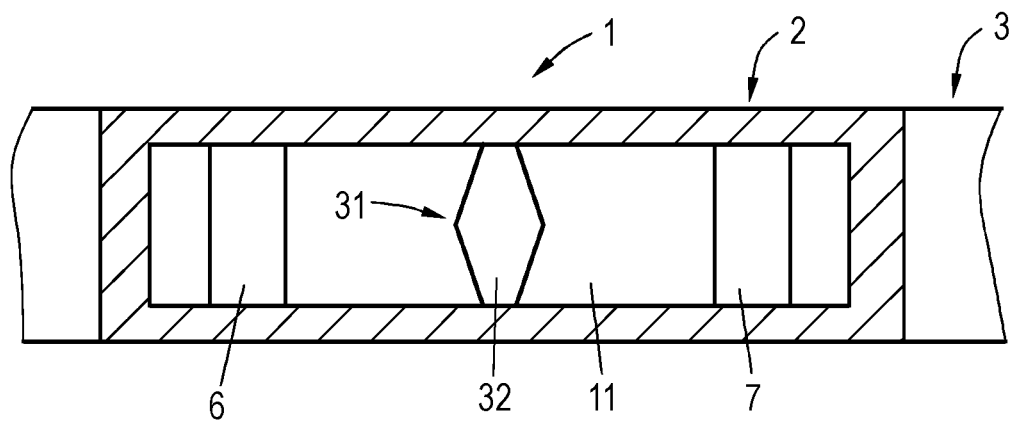

In the exemplary embodiments discussed so far, it is in principle possible for a conducted wave to be conducted in the side wall 8, or in the oscillation plate 11, directly from the oscillation transducer 6 to the oscillation transducer 7, or vice versa. In certain measurement geometries, this directly received signal may hinder or perturb the measurement of the oscillation conducted through the fluid. It may therefore be desirable to perturb the direct coupling path between the oscillation transducers 6 and 7. One possibility of this is represented in FIG. 8. Apart from the additional reflection elements 32, the structure of the measurement device 1 shown in FIG. 8 is identical to that of the measurement device shown in FIG. 1, for which reason the same references are used, a different view being shown. The oscillation plate 11 is configured to be significantly thicker in the region of a rhombus-shaped reflection element 32, so that the mode structure of the oscillation plate 11 changes in this region. A wave, excited by the oscillation transducer 6 or 7, of the oscillation plate 11 is therefore for the most part reflected at the interfaces 31 of the reflection element 32. Since the interfaces 31 are inclined relative to a connecting line of the oscillation transducers 6, 7, the formation of a standing wave is avoided.

As an alternative or in addition, at least one attenuation element (not shown), for example a flat plastic element, could also be arranged between the oscillation transducers 6, 7 on the oscillation plate, in order to attenuate the conducted wave.

The following is a summary list of reference numerals and the corresponding structure used in the above description of the invention:

1 measurement device
2 measurement module
3 measurement tube
4 base body
5 control device
6 oscillation transducer
7 oscillation transducer
8 side wall
9 contact face
10 arrow
11 oscillation plate
12 internal volume
13 clamping means
14 recess
15 control panel
16 coupling layer
17 section
18 section
19 decoupling element
20 oscillation element
21 contact element
22 excitation region
23 excitation region
24 oscillation transducer
25 oscillation transducer
26 oscillation element
27 oscillation body
28 oscillation transducer
29 oscillation element
30 oscillation body
31 interface
32 reflection element
33 oscillation transducer
34 oscillation body
35 oscillation element

The invention claimed is:

1. A measurement module for determining a fluid quantity which relates to a property of a fluid disposed in or flowing through a measurement tube formed separately from the measurement module and/or a flow thereof, the measurement module comprising:
a base body;
a control device;
a contact face;
said base body having an oscillation plate, said oscillation plate having a first side face being said contact face and a second side face;
oscillation transducers including a first oscillation transducer and a second oscillation transducer fastened at a distance from one another on or in said base body, said first and second oscillation transducers being disposed on said second side face of said oscillation plate, lying opposite said first side face, said first oscillation transducer and/or said second oscillation transducer being planar oscillation transducers disposed parallel to said contact face, said first oscillation transducer and/or said second oscillation transducer being controlled by said control device for exciting an oscillation of a side wall, or a respective side wall, of the measurement tube when said contact face, or a respective said contact face, of the measurement module is coupled to the side wall, or the respective side wall, of the measurement tube directly or via a coupling layer, wherein the oscillation of the side wall excites compression oscillations of the fluid, which can be conducted through the fluid to a respective other one of said oscillation transducers and recorded thereby said control device in order to determine a measurement quantity; and
the fluid quantity being determined by said control device in dependence on the measurement quantity.

2. The measurement module according to claim 1, wherein said oscillation plate has, disposed between said first oscillation transducer and said second oscillation transducer, a reflection element and/or attenuation element by which a wave coupled into said oscillation plate by said first oscillation transducer and/or said second oscillation transducer can be reflected and/or scattered and/or attenuated.

3. The measurement module according to claim 1, wherein said oscillation plate is configured such that a wave conducted through said oscillation plate, or together through said oscillation plate, and the side wall can be excited by driving of said first oscillation transducer and/or said second oscillation transducer by said control device.

4. The measurement module according to claim 1, wherein said base body delimits a closed internal volume, in which said first oscillation transducer and said second oscillation transducer are disposed.

5. The measurement module according to claim 1, wherein at least one respective section of said contact face, or said respective contact face, is formed by said first oscillation transducer and/or said second oscillation transducer.

6. The measurement module according to claim 1, further comprising at least one decoupling element and said first oscillation transducer and/or said second oscillation transducer are fastened on said base body by means of a respective said decoupling element used for oscillation decoupling.

7. The measurement module according to claim 1, further comprising a contact element, at least one of said oscillation plate, the side wall, or said contact element disposed between said contact face or the side wall and a respective one of said oscillation transducers can respectively be excited in a plurality of mutually separated excitation sections by at least one of said first oscillation transducer or said second oscillation transducer.

8. The measurement module according to claim 1, wherein said first oscillation transducer and/or said second oscillation transducer respectively contain an oscillation element which can be driven by said control device, and an oscillation body having a side face carrying said oscillation element, being at an angle to said contact face.

9. The measurement module according to claim 1, wherein said first oscillation transducer and/or said second oscillation transducer respectively contain a plurality of oscillation elements which are driven by said control device, and an oscillation body having side faces carrying said oscillation elements, being at an angle to said contact face.

10. The measurement module according to claim 1, further comprising a coupling element, wherein at least one respective section of said contact face, or said respective contact face, is formed by said coupling element, which is coupled to a respective one of said oscillation transducers and is formed separately from said base body.

11. A measurement device for determining a fluid quantity which relates to a property of a fluid disposed in or flowing through a measurement tube and/or a flow thereof, the measurement device comprising:
a measurement module, containing:
a base body;
a control device;
a contact face;
said base body having an oscillation plate, said oscillation plate having a first side face being said contact face and a second side face;
oscillation transducers including a first oscillation transducer and a second oscillation transducer fastened at a distance from one another on or in said base body, said first and second oscillation transducers being disposed on said second side face of said oscillation plate, lying opposite said first side face, said first oscillation transducer and/or said second oscillation transducer being planar oscillation transducers disposed parallel to said contact face, said first oscillation transducer and/or said second oscillation transducer being controlled by said control device for exciting an oscillation of a side wall, or a respective side wall, of the measurement tube when said contact face, or a respective said contact face, of said measurement module is coupled to the side wall, or the respective side wall, of the measurement tube directly or via a coupling layer, wherein the oscillation of the side wall excites compression oscillations of the fluid, which can be conducted through the fluid to a respective other one of said oscillation transducers and recorded thereby said control device in order to determine a measurement quantity; and
the fluid quantity being determined by said control device in dependence on the measurement quantity.

12. The measurement device according to claim 11, wherein the coupling layer is formed by a further fluid arranged between said measurement module and the side wall, or by a film disposed between said measurement module and the side wall.

13. The measurement device according to claim 11, further comprising a clamping means, by which said contact face is pressed onto the side wall.

14. The measurement device according claim 11, wherein the side wall of the measurement tube has a recess formed therein, and a bottom face of the recess is coupled to said contact face of said measurement module directly or via said coupling layer.

15. A method for determining a fluid quantity which relates to a property of a fluid disposed in or flowing through a measurement tube, which comprises the steps of:

providing a measurement module, being separate from the measurement tube, and containing a base body, a first oscillation transducer and a second oscillation transducer fastened at a distance from the first oscillation transducer on or in the base body, wherein a contact face, or a respective contact face, of the measurement module is coupled to a side wall, or a respective side wall, of the measurement tube directly or via a coupling layer, the base body having an oscillation plate, the oscillation plate having a first side face being the contact face and a second side face, the first and second oscillation transducers being disposed on the second side face of the oscillation plate, lying opposite the first side face, the first oscillation transducer and/or the second oscillation transducer being planar oscillation transducers disposed parallel to the contact face;

driving the first oscillation transducer and/or the second oscillation transducer for exciting an oscillation of the side wall, wherein compression oscillations of the fluid are excited by the oscillation of the side wall, which are conducted through the fluid to a respective other oscillation transducer and recorded there in order to determine a measurement quantity; and determining the fluid quantity in dependence on the measurement quantity.

* * * * *